United States Patent Office 2,905,709
Patented Sept. 22, 1959

2,905,709

PROCESS FOR THE PRODUCTION OF
TEREPHTHALIC ACID

Walter Schenk, Heidelberg, and Georg Schiller, Mannheim, Germany, assignors to Henkel & Cie. G.m.b.H., Dusseldorf-Holthausen, Germany, a corporation of Germany No Drawing. Application May 1, 1956
Serial No. 581,838

Claims priority, application Germany May 4, 1955

4 Claims. (Cl. 260—515)

This invention relates to an improved process of producing terephthalic acid from other aromatic carboxylic acids, and more particularly to an improved method of separating the terephthalic acid from the reaction mixture.

Various methods of producing terephthalic acid from other aromatic carboxylic acids have been disclosed. For example, Belgain Patents No. 524,035 and No. 522,829 describe processes for the production of terephthalic acid which comprise heating dry alkali metal salts of aromatic monocarboxylic or dicarboxylic acids, such as alkali metal benzoates or phthalates, to temperatures above 340° C. in a substantially oxygen-free inert atmosphere until a substantial portion of the starting material has been transformed into the corresponding alkali metal terephthalate, dissolving the resulting reaction mixture in water, and precipitating terephthalic acid from the aqueous solution by acidifying the solution with a dilute mineral acid, such as hydrochloric acid or sulfuric acid. Similarly, other methods of making terephthalic acid have been disclosed which comprise heating alkali metal salts of benzene polycarboxylic acids having three or more carboxyl groups attached to the benzene ring to temperatures above 300° C. in a substantially oxygen-free inert atmosphere, dissolving the resulting reaction mixture in water, and precipitating the terephthalic acid therefrom by acidification of the aqueous solution with a mineral acid.

While these processes produce very attractive yields of terephthalic acid, they have the disadvantage that the acidification of the aqueous solution of the reaction products with a mineral acid transforms the alkali metal salts of the aromatic carboxylic acids into the free acids, which precipitate leaving the alkali metal salt of the mineral acid in solution. The alkali metal salt of the mineral acid may readily be recovered from the solution, for example by evaporation, but the alkali metal atom is attached to a mineral acid radical which does not undergo a transformation into terephthalate by heating in an inert atmosphere and which is of reduced economic value. In other words, the above-described processes are not capable of being practiced in a cyclic fashion, because the alkali metal salts of mineral acids produced in the precipitation step cannot be resubjected to the transformation reaction without being first reacted with various reagents to form the alkali metal salts of aromatic carboxylic acids used as starting materials for said transformation reaction.

It is an object of the present invention to provide a process for making terephthalic acid from other aromatic carboxylic acids, wherein the alkali metal salt recovered from the precipitation step is in the form of an aromatic alkali metal carboxylate and therefore suitable for direct use as the starting material for a subsequent cycle of transformation of said aromatic alkali metal carboxylate into terephthalic acid.

Other objects and advantages of the present invention will become apparent as the descritpion thereof proceeds.

We have discovered that these objects may be achieved by heating the alkali metal salts of benzene carboxylic acids other than alkali metal terephthalates to temperatures above 300° C. but below the decomposition temperature of the salts, i.e. below about 500° C., in a substantially oxygen-free inert atmosphere until a substantial amount of alkali metal terephthalate is formed, dissolving the resulting reaction mixture in water, filtering the solution if necessary, acidifying the filtrate with a benzene carboxylic acid the alkali metal salt of which may be used in such transformation reaction, or the anhydride of such a benzene carboxylic acid, preferably at elevated temperatures, whereby terephthalic acid is precipitated, and separating the precipitated virtually pure terephthalic acid from the acidified solution. The acidification of the transformation reaction mixture with the benzene carboxylic acid forms the corresponding aromatic alkali metal carboxylate with the alkali metal ions already in the solution, so that the filtrate merely needs to be evaporated to yield alkali metal salts of a benzene carboxylic acid which may be used as the starting material for a subsequent cycle of forming terephthalic acid by the above process.

In general, the process embodying our invention is carried out in the following manner:

A benzene carboxylic acid (other than terephthalic acid) is first reacted with a suitable alkali metal compound, for example with an alkali metal hydroxide, to form the alkali metal salt of said acid. The salt is then thoroughly dried at temperatures ranging from 110° C. to about 300° C., preferably at about 150° C., to remove traces of moisture, because the presence of even small amounts of moisture during the subsequent transformation into the alkali metal terephthalate reduces the yield of terephthalate and hence terephthalic acid. Thereafter, the dry alkali metal salt of said benzene carboxylic acid is heated to a temperature above 300° C., preferably to between 370° C. and 410° C., while thoroughly agitating or stirring the salt to prevent local overheating. The heating step may be carried out at subatmospheric, atmospheric or elevated pressures as high as 100 atmospheres or more. It is important to substantially exclude oxygen from the reaction space; for example, by heating the alkali metal salt in a substantially oxygen-free atmosphere of an inert gas, such as carbon dioxide, nitrogen, methane, benzene, and the like. Also, the yields of terephthalic acid produced by the said rearrangement reaction may be improved by heating the alkali metal salt in the presence of certain catalysts, especially in the presence of metal oxides, such as iron oxide, manganese oxide, cerium oxide, cadmium oxide and lead oxide. The yield of terephthalic acid may also be improved by heating the alkali metal salt in admixture with inert solid materials, such as sand, metal shavings, inert salts, and the like.

After a substantial amount of the alkali metal salt used as the starting material has been converted into the corresponding alkali metal terephthalate under the influence of the above-described heat treatment, usually after an hour or more, the resulting reaction mixture, which consists of various alkali metal benzene carboxylates including alkali metal terephthalate, is dissolved in water, preferably at slightly elevated temperatures. The solution is then filtered to remove insoluble materials, such as the catalyst and the inert solids which were present during the heating step. Subsequently, the filtrate is neutralized or slightly acidified by adding an aromatic carboxylic acid thereto, for example benzoic, phthalic, isophthalic or any other aromatic carboxylic acid whose alkali metal salts undergo said rearrangement into the corresponding alkali metal terephthalate when heated as above described. In place of the aromatic carboxylic acid itself, the corresponding anhydride may, however, be used to acidify the filtrate. The alkali metal terephthalate contained in the solution is thereby precipitated virtually quantitatively in the form of practically pure terephthalic acid, which is filtered off on a vacuum filter. The terephthalic acid is of such a high degree of purity that it can be used directly for conversion into its esters in accordance with methods known in the art. The filtrate contains the alkali metal salts of the aromatic carboxylic acid used to acidify the solution of the original reaction mixture in a form in which they may be readily recovered by drying for further use in a subsequent transformation reaction. We have found it to be particularly advantageous to acidify the solution of the reaction mixture with benzoic acid or phthalic acid in an atmosphere of carbon dioxide at elevated pressures, for example at 20 to 50 atmospheres.

After the precipitated terephthalic acid has been filtered off, the filtrate, which contains principally the alkali metal salt of the aromaic carboxylic acid used to acidify the solution of the reaction mixture in addition to small quantities of the alkali metal salt used as the starting material, is evaporated by any suitable method; for example, in a low-pressure evaporator or by drum-drying or spray-drying. The dry salt obtained therefrom is then admixed, if desired, with additional dry aromatic alkali metal carboxylate and again subjected to the above-described heat treatment to form more alkali metal terephthalate.

Suitable alkali metal salts of aromatic carboxylic acids which may be subjected to the above-described rearrangement process are the alkali metal salts of benzoic acid, phthalic acid, isophthalic acid, hemimellitic acid, trimellitic acid, trimesitinic acid, mellophanic acid, prehnitic acid, pyromellitic acid, benzene-pentacarboxylic acid, and mellitic acid. Particularly good results are obtained by heating the potassium and thallium salts, but the other alkali metal salts—that is, the sodium, lithium, cesium and rubidium salts—are also capable of use for the present process, although the yield of terephthalic acid is not quite as high as if the starting materials are the potassium or thallium salts of these acids. In place of the finished alkali metal salts of the above aromatic carboxylic acids, mixtures consisting of these acids and alkali metal compounds such as carbonates, hydroxides, formates or oxalates, which form the aromatic alkali metal carboxylates in situ under the conditions of the heat treatment, may also be used as the initial starting material. Especially suitable for this purpose are mixtures of aromatic carboxylic acids and the carbonates, hydroxides, formates or oxalates of potassium or thallium. If the initial starting material is the alkali metal salt of a benzene polycarboxylic acid—that is, a benzene carboxylic acid having three or more carboxyl groups attached to the benzene ring—the alkali metal atom need not be substituted on all of the carboxyl groups. In other words, both the neutral and the acid alkali metal salts of the aromatic polycarboxylic acids may be used in this process.

The said acids named above may also be used as precipitating acids to precipitate terephthalic acid from the solution of the reaction mixture.

The following examples will further illustrate the present invention and enable others skilled in the art to understand our invention more completely. It will be understood that the examples are given for the purpose of illustration and that the invention is not limited thereto. The quantities of reactants given in the examples are parts by weight.

Example I 255 parts dipotassium phthalate were heated in a rotary autoclave for one hour at 170° C. at reduced pressure to remove traces of moisture. Thereafter, from 1 to 5 parts of cadmium oxide catalyst were added to the dry dipotassium phthalate and the air in the autoclave was displaced by carbon dioxide. Subsequently, the autoclave was closed and additional carbon dioxide was introduced until the internal pressure reached 20 atmospheres, whereupon the contents of the autoclave were heated to about 405° C. for three hours. At the end of this period, the autoclave was allowed to cool and the pressure was released. The solid reaction product contained in the autoclave was then admixed with 500 parts water, and the resulting solution was stirred and heated to about 60° C. until all the soluble solids had gone into solution. The undissolved solids were filtered off and the filtrate was heated. Thereafter, the hot solution was acidified with a solution of 220 parts of phthalic acid anhydride in 1400 parts water accompanied by vigorous stirring. A precipitate formed which was separated from the solution by centrifuging, washed with water and dried. It was found to consist of 165 parts pure terephthalic acid. The various filtrates were combined and evaporated in a reduced-pressure evaporator, yielding 250 parts by weight of an aromatic potassium carboxylate mixture consisting principally of dipotassium phthalate, which was admixed with from 1–5 parts of cadmium oxide catalyst and again subjected to the heat treatment above described. The reaction product of the second heat treatment again produced similar yields of pure terephthalic acid.

Example II 363 parts of the reaction mixture obtained by heating 380 parts dipotassium phthalate to 405° C. in atmosphere of carbon dioxide at a pressure of 30 atmospheres and in the presence of 1% by weight of cadmium oxide catalyst were admixed with 900 parts water, and the resulting solution was filtered on a vacuum filter to remove undissolved solids. Activated charcoal was then added to the filtrate and filtered off after a short period of time. The filtrate was acidified with 222 parts phthalic acid anhydride while maintaining the solution at the boiling point in a pressure vessel provided with a stirrer. Carbon dioxide was introduced into the pressure vessel until the internal pressure reached about 15 atmospheres. When no further decrease in pressure was noted, the pressure was released. The precipitate which was caused to separate from the solution by this treatment was removed by centrifuging. Thereafter, it was washed and dried. It consisted of 230 parts terephthalic acid. The various filtrates were combined and evaporated in a reduced-pressure evaporator, whereby 358 parts of a solid residue were formed, which consisted principally of dipotassium phthalate and small amounts of potassium benzoate. This residue was thoroughly dried and again subjected to the heat treatment above described, yielding additional pure terephthalic acid.

In place of phthalic acid anhydride used in the above examples, benzoic, isophthalic, hemimellitic, trimellitic, trimesitinic, mellophanic, prehnitic, pyromellitic, benzene-pentacarboxylic, mellitic and other aromatic carboxylic acids and their anhydrides may be used.

Example III 320 parts of potassium benzoate, after having been heated to 190° C. for 2 hours in vacuo for the removal of any residual moisture traces, and 4.8 parts of cadmium oxide are heated to 435° C. for 3 hours in an electrically heated pressure vessel at a carbon dioxide pressure of 18 atmospheres. The gas mixture is then decompressed and subjected to a fractional condensation, 68 parts of benzene being obtained.

The solid reaction product is dissolved in 1000 parts of water at boiling temperature, filtered off from the water-insoluble bottoms which substantially consist of cadmium oxide, cadmium carbonate and carbonaceous cracking products, such as diphenyl, and well washed with hot water. The solution of the filtrate which substantially consists of dipotassium terephthalate is then caused to react with 338 parts of benzoic acid at a temperature of 130° C. in a stirrer-fitted pressure vessel. After about 2 hours the reaction product is filtered hot and the terephthalic acid left as a filter cake is well washed first with hot water and then with methanol. After drying in vacuo at 150° C. 151 parts of pure terephthalic acid are obtained which can be used without any further purification, for example for the manufacture of the dimethyl ester. The solution of the filtrate which consists of potassium benzoate and free benzoic acid is neutralized in the heat with potassium carbonate and evaporated to dryness. After adding 1.5% of cadmium oxide as a catalyst, the well dried salt mixture is again subjected to a heat treatment for conversion into dipotassium terephthalate and benzene.

Example IV

A mixture of 164 parts of a benzene polycarboxlic acid mixture which consists of 7.5% of benzoic acid, 13.2% of phthalic acids, 30.2% of trimellitic acid, 26.5% of pyromellitic acid, 20.8% of benzene pentacarboxylic acid and 1.8% of mellitic acid and 132 parts of other carboxylic acids, such as succinic acid, glutaric acid, adipic acid, naphthalene carboxylic acids and picric acid, the said mixture having been obtained from ground mineral coal by pre-oxidation with air and subsequent oxidation with nitric acid of 30% strength at 165° C. at a pressure of 6 atmospheres, is brought to a pH of 6.5 with potassium hydroxide solution and to a pH of 7.0 with potassium carbonate and then evaporated to dryness. After adding 2.5 parts of cadmium oxide as a catalyst and removing any residual moisture in a vacuum drier, the reaction product is heated to 430° C. in a pressure vessel for 4 hours at a carbon dioxide pressure of 15 atmospheres. The soft-textured reaction product having a dark grey to brown coloration is decompressed, poured into 1500 parts of water and filtered off in the heat from the insoluble carbonaceous bottoms which also contain the whole of the cadmium catalyst. The clear solution of filtrate is then treated with 140 parts of the said carboxylic acid mixture obtained by the oxidation of mineral coal, at from 120° to 130° C. in a stirrer-fitted pressure vessel, the terephthalic acid contained in the filtrate solution as the dipotassium salt being disengaged. After 1½ to 2 hours the water-insoluble terephthalic acid is filtered off and well washed with hot water and methanol. After drying at 160° C. 90.5 parts of terephthalic acid are obtained.

The filtrate solution which contains the whole amount of potassium in the form of carboxylic acid salts, is partially evaporated and subjected to fractional crystallization, the aliphatic carboxylic acids being thus stripped from the benzene carboxylic acid salts in the form of their potassium salts. The latter are evaporated to dryness, combined with the catalyst and again subjected to reaction for conversion into dipotassium terephthalate.

While we have illustrated our invention with specific embodiments thereof, we wish it to be understood that our invention is not limited to these embodiments and that various changes and modifications may be made without departing from the spirit of the invention or the scope of the appended claims.

We claim:

1. In a cyclic process for the production of terephthalic acid from a benzene carboxylic acid other than terephthalic acid, by converting said benzene carboxylic acid into a salt thereof selected from the group consisting of alkali metal salts and thallium salts, heating said salt to temperatures above 300° C. but below the decomposition temperature of said salt under anhydrous conditions in a substantially oxygen-free inert atmosphere until a substantial amount of said salt has been transformed into the corresponding salt of terephthalic acid, acidifying the reaction mixture to separate free terephthalic acid from the alkali metal salt, and reusing the salt forming metal values in the process, the improvement which comprises dissolving the resulting reaction mixture in water, acidifying the aqueous solution with an acid compound selected from the group consisting of benzene carboxylic acids other than terephthalic acid and their anhydrides, separating the terephthalic acid precipitated thereby from the acidified solution, and evaporating the acidified solution to recover the benzene carboxylic acid salts dissolved therein, thereby obtaining the said metal values in a form directly reusable in the rearrangement process.

2. In a cyclic process for the production of terephthalic acid from a benzene dicarboxylic acid other than terephthalic acid, by converting said benzene dicarboxylic acid into a potassium salt selected from the group consisting of monopotassium and dipotassium salts, heating said potassium salt to temperatures above 300° C. but below the decomposition temperature of said potassium salt under anhydrous conditions in a substantially oxygen-free inert atmosphere until a substantial amount of said potassium salt has been transformed into potassium terephthalate, acidifying the reaction mixture to separate free terephthalic acid from the potassium salt, and reusing the potassium values in the process, the improvement which comprises dissolving the resulting reaction mixture in water, acidifying the aqueous solution with an acid compound selected from the group consisting of benzene dicarboxylic acids other than terephthalic acid and their anhydrides, separating the terephthalic acid precipitated thereby from the acidified solution, and evaporating the acidified solution to recover the potassium salts of dicarboxylic acids dissolved therein, thereby obtaining the potassium values in a form directly reusable in the rearrangement process.

3. In a cyclic process for the production of terephthalic acid from phthalic acid, by converting the phthalic acid into its dipotassium salt, heating the dipotassium salt to temperatures above 300° C. but below the decomposition temperature thereof under anhydrous conditions in a substantially oxygen-free atmosphere of carbon dioxide until a substantial amount of said dipotassium phthalate has been transformed into dipotassium terephthalate, acidifying the reaction mixture to separate free terephthalic acid from the potassium salt and reusing the potassium values in the process, the improvement which comprises dissolving the resulting reaction mixture in water, acidifying the aqueous solution with phthalic acid anhydride, separating the terephthalic acid precipitated thereby from the acidified solution, and evaporating the acidified solution to recover dipotassium phthalate dissolved therein, thereby obtaining the potassium values in a form directly reusable in the rearrangement process.

4. In a cyclic process for the production of terephthalic acid from phthalic acid, by converting the phthalic acid into its dipotassium salt, heating the dipotassium salt to temperatures above 300° C. but below the decomposition temperature thereof under anhydrous conditions in a substantially oxygen-free atmosphere of carbon dioxide until a substantial amount of said dipotassium phthalate has been transformed into dipotassium terephthalate, acidifying the reaction mixture to separate free terephthalic acid from the potassium salt, and reusing the potassium values in the process, the improvement which comprises dissolving the resulting reaction mixture in water, acidifying the aqueous solution with phthalic acid anhydride in an atmosphere of carbon dioxide, separating the terephthalic acid precipitated thereby from the acidified solution, and evaporating the acidified solution to recover dipotassium phthalate dissolved therein, thereby obtaining the potassium values in a form directly reusable in the rearrangement process.

References Cited in the file of this patent

UNITED STATES PATENTS 2,697,723     Carlston et al. ---------- Dec. 21, 1954

FOREIGN PATENTS 522,829     Belgium --------------- Oct. 15, 1953
524,035     Belgium --------------- Nov. 30, 1953

OTHER REFERENCES

Fieser et al.: Organic Chemistry, p. 707 (1950).